(12) United States Patent
Shibata et al.

(10) Patent No.: US 8,838,121 B2
(45) Date of Patent: Sep. 16, 2014

(54) IMAGE PROCESSING APPARATUS, METHOD AND COMPUTER-READABLE STORAGE MEDIUM

(75) Inventors: Tomoyuki Shibata, Tokyo (JP); Mayumi Yuasa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 13/315,779

(22) Filed: Dec. 9, 2011

(65) Prior Publication Data

US 2012/0076360 A1 Mar. 29, 2012

Related U.S. Application Data

(63) Continuation of application No. PCT/JP2009/002633, filed on Jun. 11, 2009.

(51) Int. Cl.
| | |
|---|---|
| *H04H 60/09* | (2008.01) |
| *H04N 5/783* | (2006.01) |
| *H04N 21/433* | (2011.01) |
| *H04N 21/44* | (2011.01) |
| *H04N 21/4147* | (2011.01) |
| *G11B 27/28* | (2006.01) |
| *H04N 5/76* | (2006.01) |
| *H04N 21/845* | (2011.01) |
| *H04N 21/426* | (2011.01) |

(52) U.S. Cl.
CPC ............... *H04N 5/76* (2013.01); *H04N 5/783* (2013.01); *H04N 21/4334* (2013.01); *H04N 21/44008* (2013.01); *H04N 21/4147* (2013.01); *G11B 27/28* (2013.01); *H04N 21/8456* (2013.01); *H04N 21/4263* (2013.01)
USPC .......................... 455/450; 455/3.04; 382/103

(58) Field of Classification Search
None
See application file for complete search history.

(56) References Cited

U.S. PATENT DOCUMENTS

| | | | |
|---|---|---|---|
| 8,019,162 B2* | 9/2011 | Zhang et al. | 382/199 |
| 2007/0118382 A1* | 5/2007 | Kuboyama et al. | 704/275 |
| 2009/0305680 A1* | 12/2009 | Swift et al. | 455/414.1 |

FOREIGN PATENT DOCUMENTS

| | | |
|---|---|---|
| JP | 10-234004 | 9/1998 |
| JP | 2002-7458 | 1/2002 |
| JP | 2004-38423 | 2/2004 |
| JP | 2007-142840 | 6/2007 |

OTHER PUBLICATIONS

Japanese Office Action for Japanese Application No. 2011-518076 mailed on May 14, 2013.
Harris, Chris, et al., "A Combined Corner and Edge Detector", 1988.

* cited by examiner

*Primary Examiner* — Erika A Washington
(74) *Attorney, Agent, or Firm* — Amin, Turocy & Watson, LLP

(57) ABSTRACT

An image processing apparatus includes a receiver, a registration section, a determination section, and a controller. The receiver receives broadcast waves including signals of a plurality of channels. The registration section registers a recognition target. The determination section determines whether or not the recognition target, registered in the registration section, exists in a frame of an image including the signals of the plurality of channels included in the broadcast waves received by the receiver. The controller sequentially switches, in accordance with a determination result obtained by the determination section, the plurality of channels received by the receiver.

6 Claims, 6 Drawing Sheets

IMAGE PROCESSING APPARATUS, METHOD AND COMPUTER-READABLE STORAGE MEDIUM

CROSS REFERENCE TO RELATED APPLICATION(S)

This is a Continuation Application of PCT Application No. PCT/JP2009/002633, filed on Jun. 11, 2009, which was published under PCT Article 21 (2) in Japanese, the entire contents of which are incorporated herein by reference.

FIELD

One or more embodiments described herein relate generally to indexing of video or the like.

BACKGROUND

There is a technique concerning an indexing process for searching recorded video or the like for an image, a sound, etc. for each particular channel.

However, in the above-described technique, it is impossible to perform an indexing process simultaneously with reception of video or the like, which is being broadcast.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION

According to one or more embodiments of the invention, there is provided an image processing apparatus including a receiver, a registration section, a determination section, and a controller. The receiver receives broadcast waves including signals of a plurality of channels. The registration section registers a recognition target. The determination section determines whether or not the recognition target, registered in the registration section, exists in a frame of an image including the signals of the plurality of channels included in the broadcast waves received by the receiver. The controller sequentially switches, in accordance with a determination result obtained by the determination section, the plurality of channels received by the receiver.

(First Embodiment)

Figure 1:
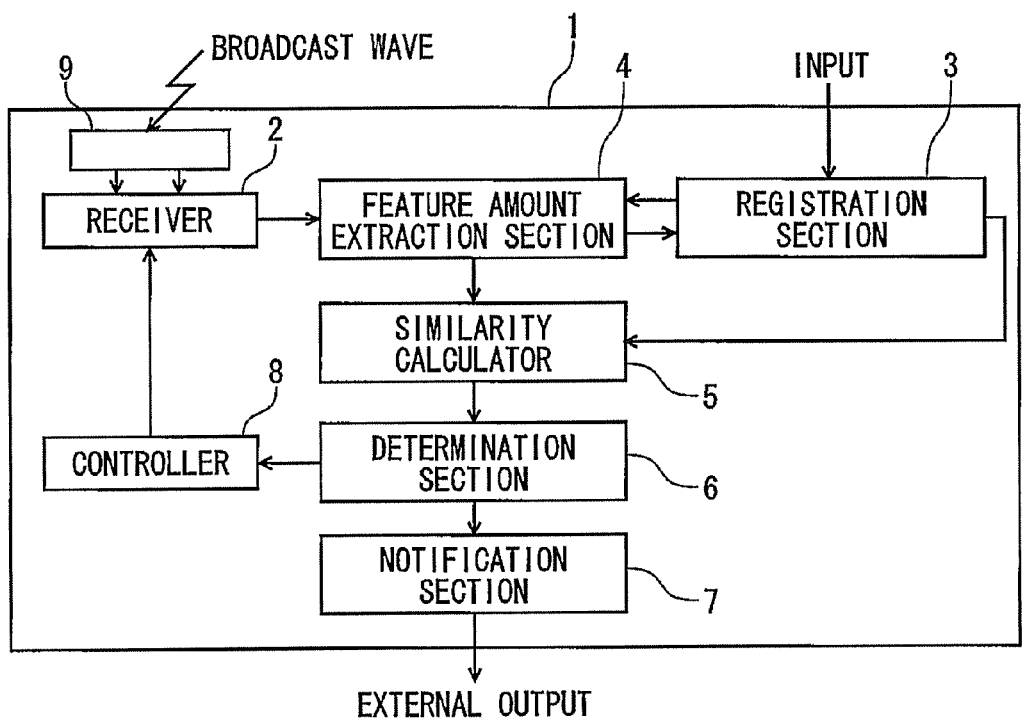
FIG. 1 is a block diagram illustrating a configuration of an image processing apparatus according to a first embodiment.

FIG. 1 is a block diagram of an image processing apparatus 1 according to a first embodiment of the present invention. The image processing apparatus 1 includes: a receiver 2 for receiving broadcast waves including a plurality of channels Ch1 to ChN (N denotes an integer of two or more); a registration section 3 for registering a recognition target; a determination section 6 for determining whether or not the recognition target, registered in the registration section 3, exists in a frame of an image (image frame) including signals of the channels received by the receiver 2; and a controller 8 for sequentially switching, in accordance with a determination result obtained by the determination section 6, the channels received by the receiver 2. Usually, in broadcast waves, signals of a plurality of channels are allocated to frequency bands corresponding to the respective channels.

The receiver 2 receives broadcast waves. In this embodiment, a case where the channel Ch1 is selected from the plurality of channels Ch1 to ChN, included in the broadcast waves, and viewed by a user by means of an input unit such as a remote control is illustratively described. The receiver 2 visualizes the signal of the received channel through a tuner section 9, and sends the resulting signal to a feature amount extraction section 4 for each frame.

The registration section 3 registers an inputted recognition target. The recognition target is a target having any shape, such as a person or an object, and includes at least either a still image or a moving image. The registration section sends at least one or more image frames, including the recognition target, to the feature amount extraction section 4 for each image frame. The registration section 3 stores, in a storage (not illustrated), a feature amount sent from the feature amount extraction section 4 as described later. The registration section 3 further sends the stored feature amount to a similarity calculator 5. Note that when the feature amount of the recognition target is extracted in advance, the registration section 3 stores this feature amount and sends this feature amount to the similarity calculator 5.

From the image frame sent from the receiver 2 and the image frame sent from the registration section 3, the feature amount extraction section 4 extracts the feature amount of the recognition target in each of the image frames. The feature amount extraction section 4 sends, to the registration section 3, the feature amount extracted from the image frame sent from the registration section 3. The feature amount sent to the registration section 3 is stored in the storage provided in the registration section 3. Note that the feature amount extraction section 4 may store the feature amount in a storage provided outside the registration section 3. Further, the feature amount extraction section 4 sends, to the similarity calculator 5, the feature amount extracted from the image frame sent from the receiver 2. In this embodiment, the feature amount extracted by the feature amount extraction section 4 is defined as a set of local image patterns in which a feature point obtained by corner point detection (see Non-Patent Document 1) is used as a base point. Furthermore, it is assumed that a region of the recognition target is known in the image frame sent from the registration section 3. Moreover, it is assumed that in the local patterns, a label is assigned to each of the region of the recognition target and the other region.

The similarity calculator 5 calculates similarity between the feature amount stored in the storage in the registration section 3 and the feature amount extracted from one image frame of the signal by the feature amount extraction section 4. The similarity calculator 5 searches through the respective local patterns, extracted from the current image frame, for the local pattern having the highest similarity among the registered local patterns, and obtains a label histogram from identification results of all the local patterns in the image frame, thereby calculating the similarity to each recognition target. The similarity calculator 5 sends the calculated similarity to the determination section 6.

As will be described later, based on the similarity calculated by the similarity calculator 5, the determination section 6 determines whether or not the recognition target exits in one image frame of the signal sent from the receiver 2. When the similarity calculated by the similarity calculator 5 is equal to or higher than a preset threshold value, the determination section 6 determines that the recognition target exists in the image frame. When the similarity calculated by the similarity calculator 5 is lower than the preset threshold value, the determination section 6 determines that no recognition target exists in the image frame. The determination section 6 sends a determination result to each of a notification section 7 and the controller 8.

The notification section 7 notifies the user of the determination result sent from the determination section 6. Examples of notification methods include a method in which notification may be made using a sound when a speaker is connected to the image processing apparatus 1, and a method in which notification may be made using an image when a display is connected to the image processing apparatus 1. It is to be noted that the notification methods are not limited to those mentioned above, but the notification may be made using both of a sound and an image; alternatively, the notification may be provided to the user by the other method in which the notification is perceivable by the user. When the image processing apparatus 1 is connected to a network, the notification may be provided to the user by sending a mail to a preset address. Further, settings may be made so that no notification is provided to the user in accordance with the user's designation.

Based on the determination result sent from the determination section 6, the controller 8 sequentially switches the plurality of channels included in the broadcast waves. Usually, the number of channels, which allows visualization simultaneously with reception of video or the like being broadcast, is equal to the number of tuners used by the receiver 2. When the number of tuners is smaller than the number of channels included in the broadcast waves, it is impossible to receive all the channels. Therefore, it has been impossible to perform an indexing process simultaneously with reception of video or the like, which is being broadcast. To the contrary, in this embodiment, it is possible to perform an indexing process simultaneously with reception of video or the like, which is being broadcast, for the channels the number of which is larger than that of tuners. For example, when the channel Ch1 is viewed by the user through a tuner 9a, the controller 8 sequentially switches the channels Ch2 to ChN which are not viewed by the user, thus carrying out control so that signals of the respective channels Ch2 to ChN are received through a tuner 9b. Thus, the signal of the channel Ch1 viewed by the user is continuously received unless the viewed channel is changed by the user, but the signals of the channels Ch2 to ChN, which are not viewed by the user, are received while being sequentially switched.

Figure 2:
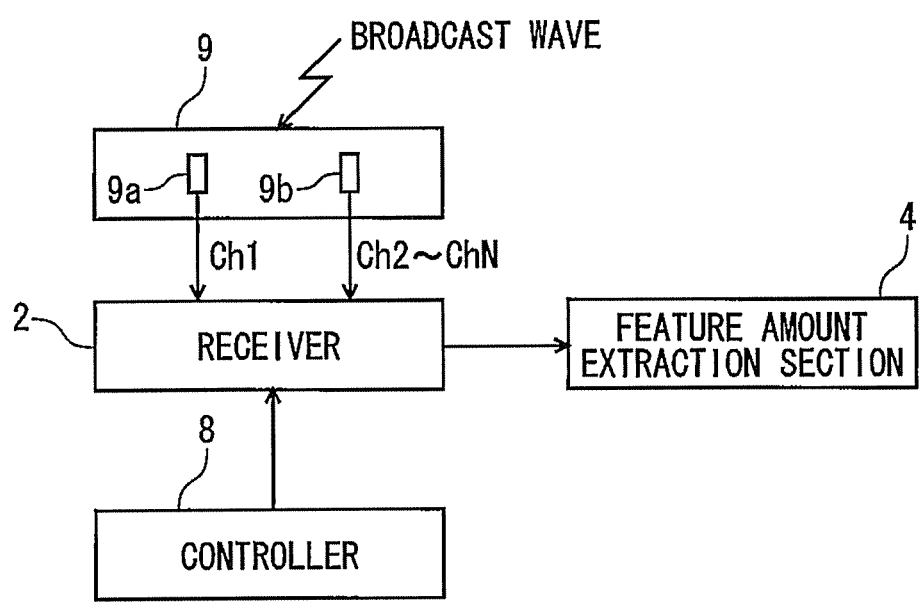
FIG. 2 is a diagram illustrating a relationship between tuners and signals of received channels.

FIG. 2 is a diagram illustrating a relationship between the tuners and the signals of the received channels. Referring to FIG. 2, the channel Ch1 is viewed by the user, and the channel Ch2 is selected from the remaining channels Ch2 to ChN and received. For each second period, the controller 8 provides a channel switching instruction for the receiver 2. The receiver 2 sequentially switches the channels Ch2 to ChN in accordance with the instruction provided from the controller 8, and receives the signal of one of the channels Ch2 to ChN. Since the channel Ch1 is viewed by the user, the signal of the channel Ch1 is subsequently visualized through the tuner 9a. The controller 8 sequentially switches the channels Ch2 to ChN received by the receiver 2, and sequentially visualizes the signals through the tuner 9b; then, after the channel has been switched to the channel ChN, the channel is returned to the channel Ch2 to repeat the switching of the channels. Note that when the channel viewed by the user is changed to another channel, the channels other than said another channel may be sequentially switched.

For the channel for which it is determined by the determination section 6 that the recognition target exists in the current image frame, no channel switching is performed, and the reception of the signal of this channel is continued until no recognition target exists in the image frame during a first period. When it is determined by the determination section 6 that no recognition target exists in the current image frame, the controller 8 sequentially switches, for each second period, the channels that are not viewed by the user. The controller 8 sequentially sends, to the receiver 2, information of the channels to be switched. Note that the first period and the second period may be the same time interval, or may be different time intervals.

Note that in the above description, channel switching is performed by the tuner other than the tuner used for viewing by the user, but the present invention is not limited to this. For example, the signal of the channel received by the tuner, used for viewing by the user, may be read from a storage for display and transferred to a storage for processing to determine whether or not the recognition target exists. Thus, whether or not the recognition target exists may also be determined for the signal of the channel received by the tuner used for viewing by the user. As a result, the signals of the channels, in which the recognition target exists, may be obtained by utilizing all the tuners used by the receiver 2. Further, although the case where the single channel is viewed by the user has been described, the present invention is not limited to such a case. When a plurality of channels are simultaneously viewed by the user, the channels other than the plurality of channels viewed by the user may be sequentially switched. Furthermore, as mentioned above, the signals of the plurality of channels viewed by the user may be read from the storage for display and transferred to the storage for processing, and thus whether or not the recognition target exists may also be determined for the channels viewed by the user.

Figure 3:
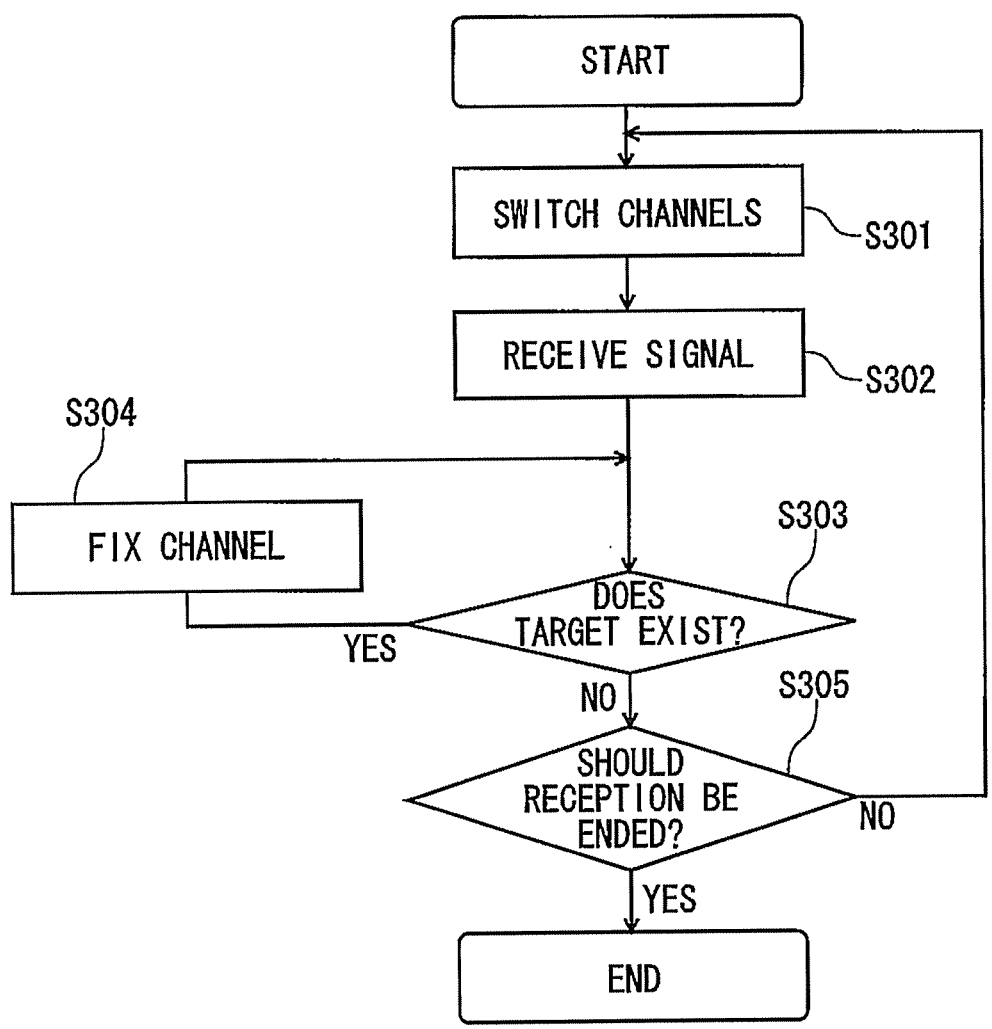
FIG. 3 is a diagram illustrating a flow chart of operations according to the first embodiment.

FIG. 3 is a diagram illustrating a flow chart of operations of the image processing apparatus 1.

In Step S301, the controller 8 sequentially switches a plurality of channels, included in broadcast waves, at preset time intervals. All the receivable channels can be received by sequentially changing the channels.

In Step S302, the receiver 2 receives a signal of the channel for which an instruction has been provided from the controller 8. The receiver 2 visualizes the received signal through the corresponding tuner, and sends the resulting signal to the feature amount extraction section 4 for each image frame. The feature amount extraction section 4 extracts the feature amount of the recognition target from each of the image frame sent from the receiver 2 and the image frame sent from the registration section 3. The feature amount extraction section 4 sends, to the registration section 3, the feature amount extracted from the image frame sent from the registration section 3.

In Step S303, the determination section 6 determines whether or not the recognition target exits in one image frame of the signal received by the receiver 2. As mentioned above, based on the similarity calculated by the similarity calculator 5, the determination section 6 determines whether or not the recognition target exits. The similarity in this case corresponds to similarity between the feature amount of the recognition target stored in the registration section 3 and the feature amount extracted by the feature amount extraction section 4. When the recognition target exists ("YES" in Step S303), the determination section 6 moves the processing to Step S304. When no recognition target exists ("NO" in Step S303), the determination section 6 moves the processing to Step S305.

In Step S304, the controller 8 does not perform channel switching but fixes the received channel. Thus, image frames existing in the fixed channel and including the recognition target can be continuously acquired (or recorded, for example).

In Step S305, the controller 8 determines whether or not the reception of the channel should be ended. For example, a channel reception time or the like may be set in advance, and the end of the reception may be determined based on this reception time.

As described above, in the present embodiment, the signals of a plurality of channels included in broadcast waves are visualized, and the similarity between the feature amount extracted from each image frame and the feature amount of the recognition target extracted in advance is evaluated. Using the evaluation result obtained in this case, the channels for visualization are sequentially switched, thereby making it possible to conduct a search (indexing process) for an image, a sound, etc. simultaneously with reception of video or the like, which is being broadcast.

(Second Embodiment)

Figure 4:
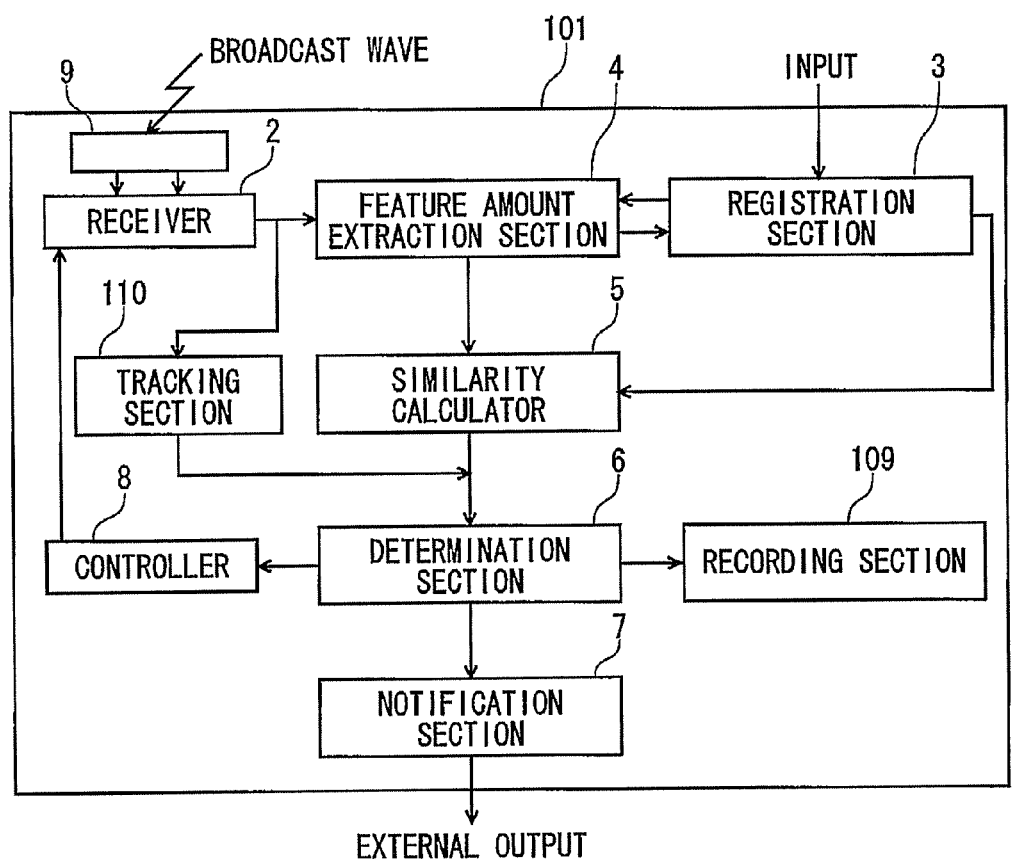
FIG. 4 is a block diagram illustrating a configuration of an image processing apparatus according to a second embodiment.

FIG. 4 is a block diagram of an image processing apparatus 101 according to a second embodiment of the present invention. The image processing apparatus 101 differs from the image processing apparatus 1 in that the image processing apparatus 101 further includes a recording section 109 and a tracking section 110. Description of components of the image processing apparatus 101, which are similar to those of the image processing apparatus 1, will be omitted.

The receiver 2 receives signals of a plurality of channels included in broadcast waves. Of the received signals, the signal of the channel, for which an instruction has been provided from the controller 8, is visualized by the receiver 2 through two or more tuners. As will be described later, when it is determined by the determination section 6 that tracking is successful, the receiver 2 sends the visualized signal to the feature amount extraction section 4 for each image frame.

For the image frame sent from the receiver 2, the feature amount extraction section 4 learns a model based on a facial image region of a recognition target learned in advance, and detects a facial region based on this model. The feature amount extraction section 4 extracts a feature amount for each detected facial region. This feature amount is defined as a normalized image obtained by detecting a facial component and normalizing an image based on the position of a facial component. Note that the normalized image may be subjected to pre-processing by a filter or the like through which illumination variation is suppressed.

The similarity calculator 5 calculates similarity between the registered feature amount and the feature amount of the facial region detected from the current image frame. The similarity calculator 5 sends the calculated similarity to the determination section 6.

When the similarity calculated by the similarity calculator 5 is equal to or higher than a preset threshold value, the determination section 6 determines that the recognition target exists in the image frame. When the similarity calculated by the similarity calculator 5 is lower than the preset threshold value, the determination section 6 determines that no recognition target exists in the image frame. Further, as will be described later, when tracking likelihood calculated by the tracking section 110 is equal to or higher than a threshold value different from the above-mentioned threshold value, the determination section 6 determines that tracking is successful, but when the tracking likelihood is lower than the threshold value, the determination section 6 determines that tracking is unsuccessful. The determination section 6 sends determination results to the notification section 7, the controller 8 and the recording section 109. Furthermore, upon determination that the registered recognition target exists or tracking is successful, the determination section 6 sends, to the tracking section 110, position information of the facial region of the registered recognition target in the current image frame.

For the channel for which it is determined by the determination section 6 that the recognition target exists in the current image frame, the controller 8 does not perform channel switching and allows continuous reception until tracking of the registered recognition target becomes unsuccessful.

When it is determined by the determination section 6 that the recognition target exists, the recording section 109 starts recording from the image frame in which the recognition target is recognized. In the tracking section 110 described later, when the image frame for which tracking is unsuccessful is continued for a given period of time, the recording is stopped. Note that a process of ending the recording may be performed on the basis of the end of the current broadcast program obtained from an electronic program guide (EPG) or the like.

For the image frame sent from the receiver 2, the tracking section 110 limits the range and size of the facial region in accordance with the sent facial region position information, and detects the facial region based on the model learned from the facial image region of the recognition target learned in advance. The tracking section 110 further calculates similarity between the detected facial region and the facial region of the previous image frame, and sends, as the tracking likelihood, the calculated similarity to the determination section 6.

Figure 5:
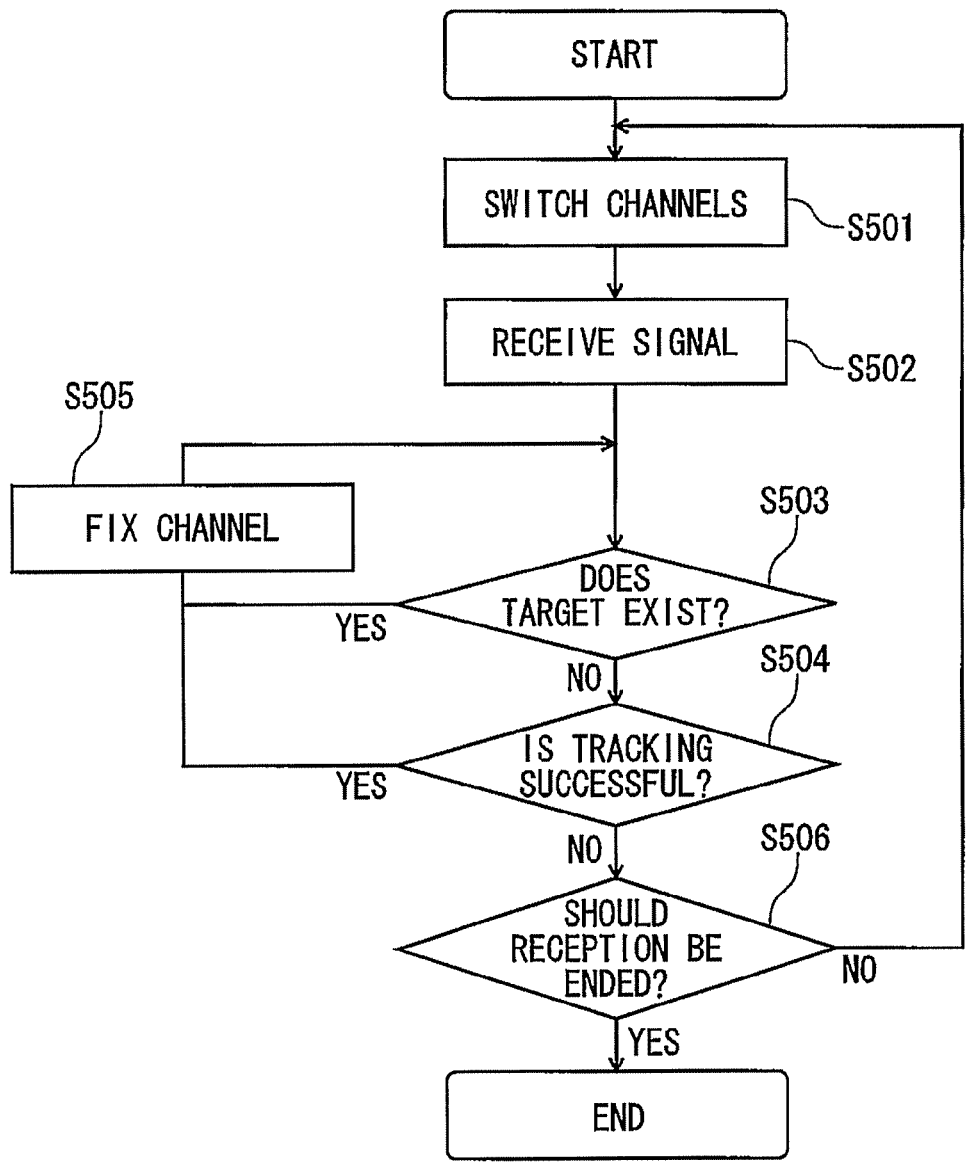
FIG. 5 is a diagram illustrating a flow chart of operations according to the second embodiment.

FIG. 5 is a diagram illustrating a flow chart of operations of the image processing apparatus 101. Of the operations of the image processing apparatus 101, the operations of Steps S501 to S503, Step S505 and Step S506 are similar to those of Steps S301 to S305 illustrated in FIG. 3, and therefore, description thereof will be omitted.

In Step S504, the tracking section 110 calculates the similarity between the detected facial region and the facial region of the previous image frame, and sends, as the tracking likelihood, the calculated similarity to the determination section 6. Upon determination that tracking is successful ("YES" in Step S504), the determination section 6 moves the processing to Step S505. Upon determination that tracking is unsuccessful ("NO" in Step S504), determination section 6 moves the processing to Step S506.

As described above, in the present embodiment, for the channel for which it is determined that the recognition target exists in the current image frame, the signal is received until the recognition target is not recognized for a given period of time from the image frame in which the registered recognition target is recognized, or until the recognition target is not tracked. Further, using the evaluation result obtained in this case, the channels are sequentially switched; then, when the registered recognition target is recognized, the subsequent process is switched to tracking, and the tracking is continued until the recognition target cannot be tracked.

(Third Embodiment)

Figure 6:
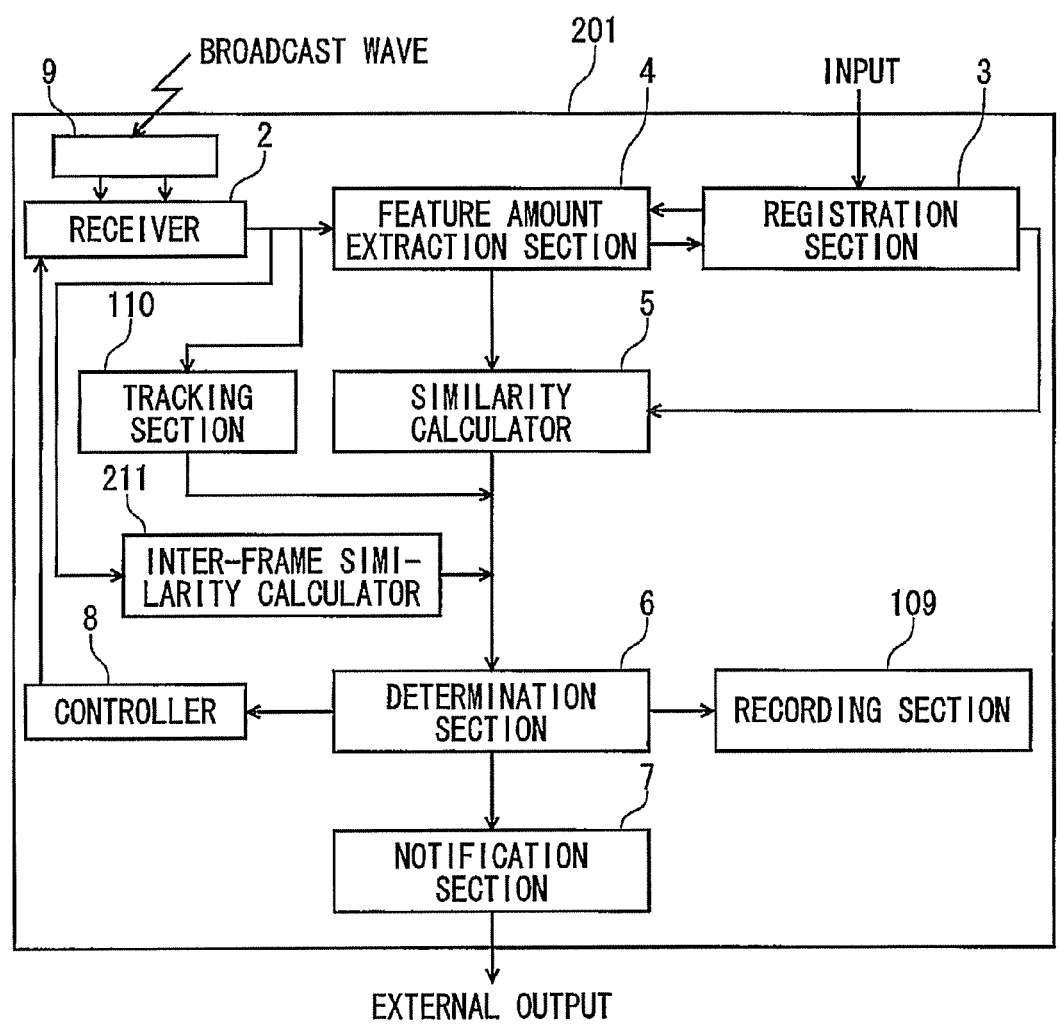
FIG. 6 is a block diagram illustrating a configuration of an image processing apparatus according to a third embodiment.

FIG. 6 is a block diagram of an image processing apparatus 201 according to a third embodiment of the present invention. Description of components of the image processing apparatus 201, which are similar to those of the image processing apparatus 101, will be omitted.

The receiver 2 also sends image frames to an inter-frame similarity calculator 211 in addition to the feature amount extraction section 4 and the tracking section 110.

For temporally continuous image frames of the same channel, the inter-frame similarity calculator 211 calculates similarity between the image frames. The inter-frame similarity calculator 211 re-sizes the entire image frame to a given size, and then obtains a cosine correlation value as a single vector to determine the similarity. The inter-frame similarity calculator 211 sends the calculated inter-frame similarity to the determination section 6.

The determination section 6 reduces a processing time allocated to control for the channel other than the channel for which the recognition target is recognized or the channel for which tracking is successful. Specifically, the determination section 6 reduces the proportion of the processing time allocated to the channel for which the inter-frame similarity sent from the inter-frame similarity calculator 211 is continuously lower than a threshold value, so that the proportion of the processing time allocated to this channel is shorter than that of the processing time allocated to the other channel.

As described above, in this embodiment, video is stored until a registered person or the like is not recognized for a given period of time from the image frame in which the registered person is recognized, or until the registered person is not tracked. The priority of the channel for which the inter-frame difference is small in this case is reduced to perform processing, thus making it possible to increase the processing time for the channel, in which the recognition target appears, on a priority basis.

Note that each function of each component of the image processing apparatus according to each embodiment of the present invention may also be realized by a program stored in a computer. Further, the present invention is not limited to the foregoing embodiments but may be implemented by making modifications to constituent elements at an implementation stage without departing from the scope of the present invention. Furthermore, various inventions may be provided by an appropriate combination of a plurality of the constituent elements disclosed in the foregoing embodiments. For example, several constituent elements may be eliminated from the entire constituent elements disclosed in the embodiments. Moreover, the constituent elements in the different embodiments may be combined as appropriate.

What is claimed is:

1. An image processing apparatus comprising:
a receiver that receives broadcast waves including signals of a plurality of channels;
a registration section that registers a recognition target;
a determination section that determines whether or not the recognition target, registered in the registration section, exists in a frame of an image including the signals of the plurality of channels included in the broadcast waves received by the receiver; and
a controller that sequentially switches, in accordance with a determination result obtained by the determination section, the plurality of channels received by the receiver,
wherein the determination section reduces a proportion of a processing time allocated to a channel for which frame similarly to a prior image frame is continuously lower than a threshold value for continuous image frames of the same channel, so that the proportion of the processing time allocated to said channel is shorter than a proportion of a processing time allocated to the other channel.

2. The image processing apparatus according to claim 1, wherein when it is determined by the determination section that the recognition target exists, the controller does not switch the plurality of channels received by the receiver.

3. The image processing apparatus according to claim 2, further comprising a tracking section that performs a tracking process based on a recognition result of the recognition target in a previous frame of the same channel,
wherein the determination section determines whether or not tracking is successful based on a result of the tracking process performed by the tracking section, and
wherein the controller does not change the channel while it is determined by the determination section that the tracking of the recognition target is successful.

4. The image processing apparatus according to claim 3, wherein the determination section reduces a proportion of a processing time allocated to a channel for which similarity to the previous image frame of the same channel is continuously lower than a threshold value, so that the proportion of the processing time allocated to this channel is shorter than that of the processing time allocated to the other channel.

5. An image processing method for controlling an image processing apparatus, the method comprising:
receiving broadcast waves including signals of a plurality of channels by a receiver;
registering a recognition target by a registration section;
determining, by a determination section, whether or not the recognition target registered in the registration section exists in the signals of the plurality of channels included in the broadcast waves received by the receiver; and
sequentially switching, by a controller, in accordance with a determination result obtained by the determination section, the plurality of channels received by the receiver,
wherein the determination section reduces a proportion of a processing time allocated to a channel for which frame similarity to a prior image frame is continuously lower than a threshold value for continuous image frames of the same channel, so that the proportion of the processing time allocated to said channel is shorter than a proportion of a processing time allocated to the other channel.

6. A non-transitory computer-readable storage medium that stores a program for causing an image processing apparatus to execute procedures comprising:
receiving broadcast waves including signals of a plurality of channels;
registering a recognition target;
determining whether or not the registered recognition target exists in the signals of the plurality of channels included in the received broadcast waves; and
sequentially switching the received plurality of channels in accordance with the determination result,
wherein the determining reduces a proportion of a processing time allocated to a channel for which frame similarity to a prior frame is continuously lower than a threshold value for continuous image frames of the same channel, so that the proportion of the processing time allocated to said channel is shorter than a proportion of a processing time allocated to the other channel.

* * * * *